(12) United States Patent
Hawkins et al.

(10) Patent No.: US 11,740,693 B2
(45) Date of Patent: Aug. 29, 2023

(54) GAZE BASED VIDEO STREAM PROCESSING

(71) Applicant: Microsoft Technology Licensing, LLC, Redmond, WA (US)

(72) Inventors: Brian T. Hawkins, Cheltenham (GB); Alexandros Neophytou, London (GB); Eric Chris Wolfgang Sommerlade, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 17/232,238

(22) Filed: Apr. 16, 2021

(65) Prior Publication Data

US 2022/0334635 A1 Oct. 20, 2022

(51) Int. Cl.
  *G06F 3/01* (2006.01)
  *G06T 7/73* (2017.01)
  *H04N 7/01* (2006.01)
  *H04N 7/08* (2006.01)

(52) U.S. Cl.
  CPC .............. *G06F 3/013* (2013.01); *G06T 7/73* (2017.01); *H04N 7/0127* (2013.01); *H04N 7/0806* (2013.01); *G06T 2207/20084* (2013.01); *G06T 2207/30201* (2013.01)

(58) Field of Classification Search
  CPC . G06F 3/013; G06T 7/73; G06T 2207/20084; G06T 2207/30201; H04N 7/0127; H04N 7/0806

USPC ........................................................ 348/576
See application file for complete search history.

(56) References Cited

U.S. PATENT DOCUMENTS

| | | | |
|---|---|---|---|
| 9,804,669 B2* | 10/2017 | Fateh | G02B 27/646 |
| 10,884,494 B1 | 1/2021 | Lagies et al. | |
| 2019/0080474 A1 | 3/2019 | Lagun et al. | |
| 2019/0355332 A1* | 11/2019 | Knez | G09G 3/2092 |
| 2020/0045261 A1 | 2/2020 | Lim et al. | |
| 2022/0236793 A1* | 7/2022 | Mulpuri | G06F 3/04815 |

OTHER PUBLICATIONS

Li et al, "Training a Camera to Perform Long-Distance Eye Tracking by Another Eye-Tracker", IEEE Access, vol. 7, pp. 155313= 15324 (Year: 2019).*

Reeves et al. "Adaptive foveation of MPEG video", Proceedings of ACM Multimedia 96. Boston, Nov, 18-22, 1996; [Proceedings of ACM Multimedia, New York, ACM, US, Feb. 1, 1997 (Feb. 1, 1997), pp. 231-241 (Year: 1997).*

(Continued)

*Primary Examiner* — John W Miller
*Assistant Examiner* — Omer Khalid

(57) ABSTRACT

In various embodiments, a method for processing video streams is described. A plurality of video streams for transmission to a display device are received. The plurality of video streams have respective initial image quality levels. An estimated gaze location of a user of the display device is estimated. At least one video stream of the plurality of video streams is processed to have a modified image quality level based on the estimated gaze location. The modified image quality level is less than a corresponding initial image quality level. The plurality of video streams are transmitted to the display device.

20 Claims, 9 Drawing Sheets

(56) References Cited

OTHER PUBLICATIONS

Li et al, "Training a Camera to Perform Long-Distance Eye Tracking by Another Eye-Tracker", IEEE Access, vol. 7 pp. 153313-15324 (Year: 2019).*
Gazi et al., "Foveated Video Streaming for Cloud Gaming", Arxiv. ORG, Cornell University Library, 201 Olin Library Cornell University Ithaca, NY 14853, Jun. 15, 2017 (Year: 2017).*
Illahi, et al., "Foveated Video Streaming for Cloud Gaming", In repository of arXiv:1706.04804v1, Jun. 15, 2017, 6 Pages.
Li, et al., "Training a Camera to Perform Long-Distance Eye Tracking by Another Eye-Tracker", In Journal of IEEE Access, vol. 7, Oct. 23, 2019, pp. 155313-155324.
Matthews, et al., "Rendering Optimizations for Virtual Reality Using Eye-Tracking", In Proceedings of 2020 22nd Symposium on Virtual and Augmented Reality, Nov. 7, 2020, pp. 398-405.
Melesse, et al., "Appearance-Based Gaze Tracking Through Supervised Machine Learning", In Proceeding of 2020 15th IEEE International Conference on Signal Processing, Dec. 6, 2020, pp. 467-471.
"International Search Report and Written Opinion Issued in PCT Application No. PCT/US22/022698", dated Jul. 1, 2022, 14 Pages.
Reeves, et al., "Adaptive Foveation of MPEG Video", In Proceedings of the Fourth ACM International Conference on Multimedia, Feb. 1, 1997, pp. 231-241.

* cited by examiner

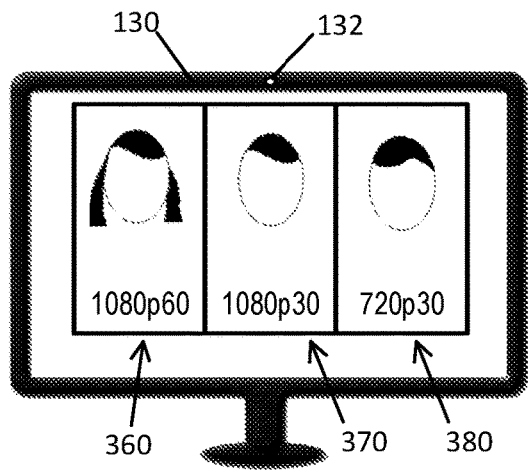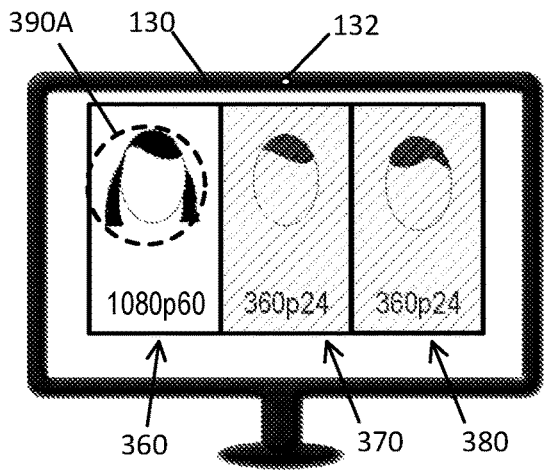
Fig. 3A  Fig. 3B
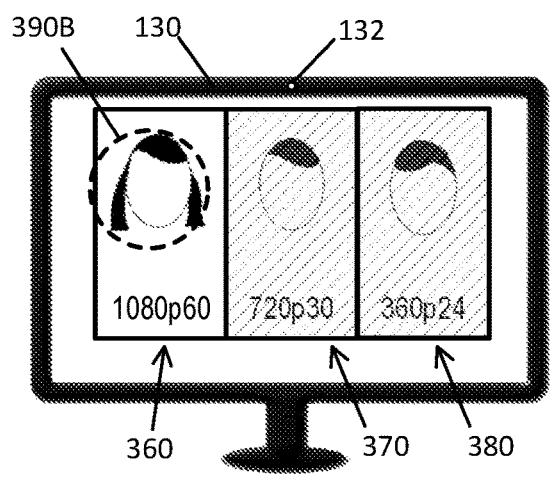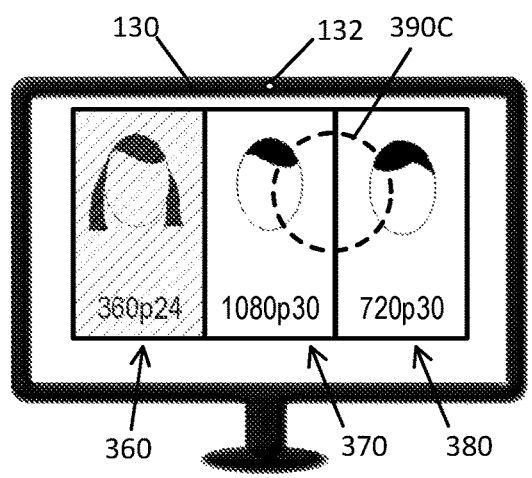
Fig. 3C  Fig. 3D

GAZE BASED VIDEO STREAM PROCESSING

BACKGROUND

Traditionally, foveated rendering takes advantage of the physical limitation of the human visual system in order to render high quality video using a fraction of the data or processing effort. Foveated rendering relies on the fact that the human visual system sees robust detail only within a focal region that is generally 5-10 degrees of the retinal fovea, quickly falling off to 20% or less detail awareness outside of 10 degrees. As such, foveated renderers only render dense pixels in the region that the viewer is looking. Outside of the focal region the renderer reconstructs the image from sparse data. Foveated rendering requires an awareness of the viewer's gaze direction to work effectively. Where calibrated gaze tracking devices are utilized, such as in the fields of virtual reality and augmented reality, foveated rendering is becoming a popular technique. However, foveated rendering has gained little traction beyond these fields due to difficulties of gaze tracking.

SUMMARY

Aspects of the present disclosure are directed to processing video streams based on a gaze location. For example, a user may interact with a computing system that may utilize a gaze estimation system to estimate a gaze location of the user, thereby allowing a stream processor to reduce quality of video streams that the user is not actively watching. Reducing the quality may allow for a reduced bandwidth utilized to transmit the video streams.

In accordance with some examples of the present disclosure, a method for processing video streams is described. A plurality of video streams for transmission to a display device are received. The plurality of video streams have respective initial image quality levels. An estimated gaze location of a user of the display device is estimated. At least one video stream of the plurality of video streams is processed to have a modified image quality level based on the estimated gaze location. The modified image quality level is less than a corresponding initial image quality level. The plurality of video streams are transmitted to the display device.

In accordance with some examples of the present disclosure, a system for processing video streams is described. The system includes a processor and a memory storing computer-executable instructions that when executed by the processor cause the system to: receive a plurality of video streams for transmission to a display device, the plurality of video streams having respective initial image quality levels; identify an estimated gaze location of a user of the display device; process at least one video stream of the plurality of video streams to have a modified image quality level based on the estimated gaze location, the modified image quality level being less than a corresponding initial image quality level; transmit the plurality of video streams to the display device.

In accordance with some examples of the present disclosure, a method for processing video streams is described. The method includes receiving a plurality of video streams for display by a display device. The plurality of video streams have respective initial image quality levels. The method also includes identifying an estimated gaze location of a user of the display device. The method further includes processing at least one video stream of the plurality of video streams to have a modified image quality level based on the estimated gaze location. The modified image quality level is higher than a corresponding initial image quality level. The method also includes displaying the plurality of video streams by the display device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 3A, 3B, 3C, and 3D depict an example of processing video streams based on estimated gaze locations, according to an embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present disclosure are directed to processing video streams based on a gaze location. For example, a user may interact with a computing system that may utilize a gaze estimation system to estimate a gaze location of the user, thereby allowing a stream processor to reduce quality of video streams that the user is not actively watching.

In accordance with examples of the present disclosure, video streams may be processed differently based on whether they are to be displayed within a foveal region of a user. A user gaze generally occurs when a user looks steadily and intently at an object or in a particular direction, referred to herein as a gaze location. The gaze location may be estimated, detected, or otherwise determined by the computing system using the image sensor. That is, the image sensor may acquire one or more images and estimate the gaze location based on the one or more images. The estimated gaze location may then be used to process video streams that are to be displayed to the user, such as reducing image quality of video streams that are displayed outside of the estimated gaze location, increasing image quality of video streams that are displayed inside the estimated gaze location, etc.

Figure 1:
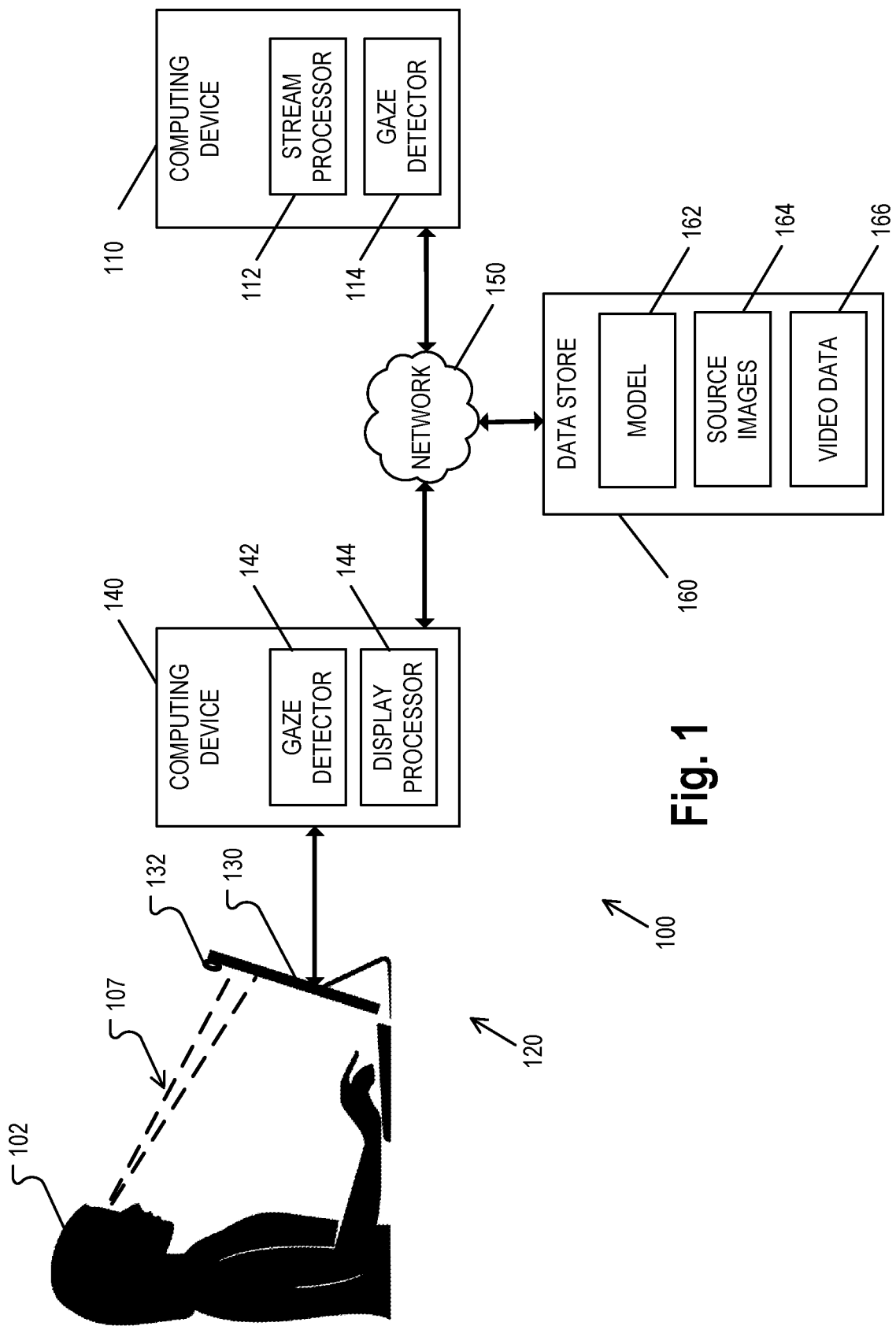
FIG. 1 depicts an example of a video processing system that is configured to process video streams based on an estimated gaze location of a user, according to an embodiment.

In accordance with embodiments of the present disclosure, FIG. 1 depicts an example of a video processing system 100 that is configured to process video streams based on an estimated gaze location of a user, for example, a user 102. The video processing system 100 includes a computing device 110 and a display device 120. In some embodiments, the video processing system 100 also includes a data store 160. A network 150 communicatively couples computing device 110, display device 120, and data store 160. The network 150 may comprise one or more networks such as local area networks (LANs), wide area networks (WANs), enterprise networks, the Internet, etc., and may include one or more of wired, wireless, and/or optical portions.

The computing device 110 is generally configured to receive a plurality of video streams and provide a representation of those video streams to the display device 120 for display to the user 102. Examples of the computing device 110 include a network server, cloud server, or other suitable computing device. The computing device 110 may include a stream processor 112 that processes the video streams for transmission to the display device 120. In various embodiments, the stream processor 112 is configured to reduce a transmission bit rate of at least one video stream before transmission to the display device 120, as described herein. The computing device 110 may also include a gaze detector 114, which is configured to identify an estimated gaze location of a user, such as the user 102. The estimated gaze location generally corresponds to a location on or near the display device 120 at which a gaze 107 of the user 102 is directed. In an embodiment, the gaze detector 114 is configured to utilize a neural network model, such as a neural network model 162, described below. In other embodiments, the gaze detector 114 is omitted from the computing device 110.

The display device 120 is configured to display video streams received from the computing device 110 and includes a display 130 and a computing device 140. In some embodiments, the display 130 and computing device 140 are formed as an integral component, for example, when the display device 120 is implemented as a smartphone, laptop computer, tablet computing device, mobile computing device, or other suitable device. In other embodiments, the display 130 and computing device 140 are formed as separate components, for example, when the display device 120 is implemented as a standalone computer monitor (as display 130) and desktop computing device (as computing device 140), a television (as display 130) and gaming console (as computing device 140), or other suitable combination of separate components.

The display device 120 includes an image sensor 132 having a field-of-view and capable of acquiring one or more images of the user 102, where the user may be included in the field-of-view of the image sensor 132, in various embodiments. In various embodiments, the display device 120 and/or the computing device 110 utilize images captured by the image sensor 132 to identify an estimated gaze location of the user 102. In some scenarios, the image sensor 132 captures a video stream, for example, during a video conference in which the user 102 is a participant, and the one or more images are part of the video stream. In other scenarios, the image sensor 132 captures the one or more images for the purpose of estimating the gaze location. The image sensor 132 may be any image sensor capable of acquiring one or more images, where the one or more images may be an image derived from light of the infrared spectrum, the visible light spectrum, and/or or another suitable light spectrum. The image sensor 132 may be implemented as a webcam, front-facing camera (e.g., a "selfie" camera), or other suitable image capture device of the display device 120. In the embodiment shown in FIG. 1, the image sensor 132 is located on a top bezel of the display 130. In other embodiments, the image sensor 132 may be located on a different portion of the display 130 (e.g., a different bezel, a stand portion of the display 130), embedded within a screen of the display 130 (an "under-screen" or "under-display" camera), or provided as a standalone image sensor (e.g., as a webcam connected via a Universal Serial Bus). Advantageously, the image sensor 132 may be an uncalibrated and relatively low power camera and need not be a specialized gaze tracking system.

In accordance with examples of the present disclosure, the image sensor 132 may obtain one or more images of the user 102, where the user 102 is within a field-of-view of the image sensor 132. The one or more images acquired by the image sensor 132 may be provided to a neural network model executing at a neural processing unit. The neural network model may determine and provide gaze information of the user 102 (e.g., an estimated gaze location) to the stream processor 112. Because the neural processing unit is specifically designed and/or programmed to process neural network tasks, the consumption of resources, such as power and/or computing cycles, is less than the consumption would be if a central processing unit were used. The gaze information determined and provided by the neural network model may include an estimated gaze location of the user 102. The estimated gaze location of the user may correspond to a location, such as an X, Y, Z coordinate, on and/or around the display 130. The gaze information may indicate that the user 102 is staring intently at an object, in a direction, and/or at a location that does not involve the display 130. For example, the user gaze may be above the display 130.

The computing device 140 includes a gaze detector 142 which is configured to identify an estimated gaze location of a user, such as the user 102. The gaze detector 142 is generally similar to the gaze detector 114, described above. The computing device 140 may also include a display processor 144 that processes video streams for display by the display 130. In some embodiments, the display processor 144 is configured to perform one or more image enhancement algorithms on one or more video streams to improve their appearance, for example, a super resolution algorithm that increases a spatial resolution or frame rate of the video stream, a sparse reconstruction algorithm, a foveated decoding algorithm, or other suitable image enhancement algorithms. In other words, the display processor 144 is configured to process a first video stream having relatively low image quality to generate a second video stream having a relatively higher image quality. The display processor 144 may utilize the estimated gaze location to select a subset of received video streams for the image enhancement algorithms, for example, only those video streams within the estimated gaze location. In this way, the computing device 140 provides high quality video streams where a user is gazing, but lower quality video streams where a user cannot readily discern additional detail, which saves processor cycles for other activities.

The data store 160 is configured to store data, for example, the neural network model 162, source images 164, and/or video data 166. In various embodiments, the data store 160 is a network server, cloud server, video conferencing server, network attached storage ("NAS") device, or other suitable computing device. Data store 160 may include one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium. Although only one data store 160 is shown in FIG. 1, the video processing system 100 may include two, three, or more similar data stores. Moreover, the network 150 may provide access to other data stores, similar to data store 160 that are located outside of the video processing system 100, in some embodiments.

The neural network model 162 is configured to estimate a gaze location of a user based on one or more images of the user. In some scenarios, the neural network model 162 is trained to estimate the gaze location using the source images 164. For example, the source images 164 include various images, at least some of which include faces of users gazing at an identifiable point or region, and the neural network model 162 is trained to identify the point or region. The video data 166 may include recorded videos, video streams, or data that may be used to generate a video stream (e.g., a graphics engine and textures for rendering a user display of a game or environment). The data store 160 includes a neural network model 162 and source images 164 for training the neural network model 162, in some embodiments. In other embodiments, the source images 164 are omitted from the data store 160, but are stored in another suitable storage.

Figure 2:
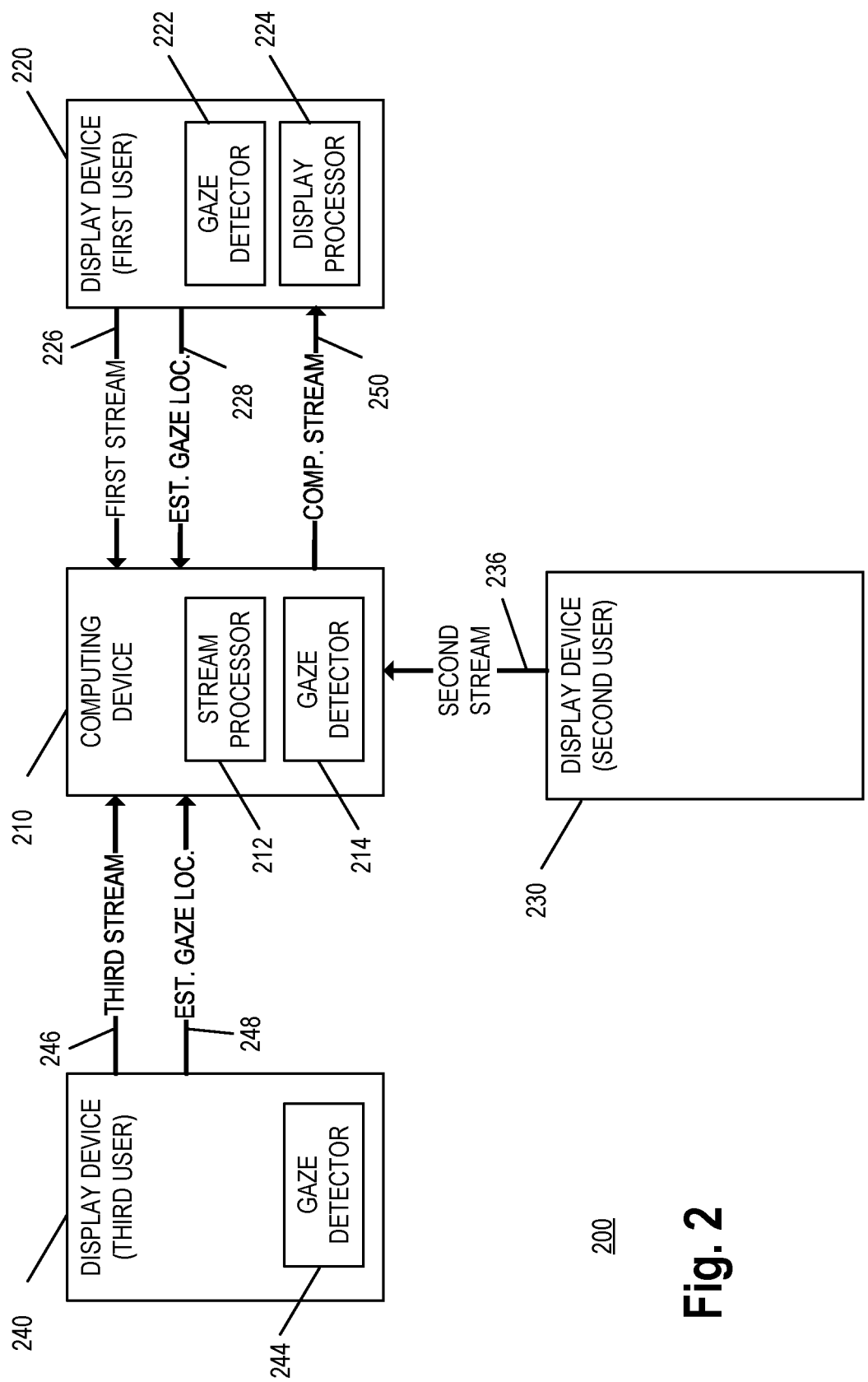
FIG. 2 depicts an example of a video processing system that is configured to process video streams based on an estimated gaze location of a user, according to an embodiment.

FIG. 2 depicts an example of a video processing system 200 that is configured to process video streams based on an estimated gaze location of a user, according to an embodiment. The video processing system 200 includes a computing device 210, a first display device 220 for a first user, a second display device 230 for a second user, and a third display device 240 for a third user. The computing device 210 generally corresponds to the computing device 110 of FIG. 1 and includes a stream processor 212 (e.g., stream processor 112). The computing device 210 may also include a gaze detector 214 (e.g., gaze detector 114).

In the embodiment shown in FIG. 2, the computing device 210 is an intermediary or central distribution point for a video conference between the first, second, and third users. In this embodiment, the computing device 210 receives first, second, and third video streams 226, 236, and 246 from the first, second, and third display devices 220, 230, and 240, respectively, for the video conference. The computing device 210 processes the video streams based on an estimated gaze location 228 of the first user and provides a composite video stream 250 to the first display device 220.

The first display device 220 generally corresponds to the display device 120 of FIG. 1 and includes a gaze detector 222 (e.g., gaze detector 142) and display processor 224 (e.g., display processor 144). The first display device 220 captures the first video stream 226 using an image sensor, such as the image sensor 132. Additionally, the first display device 220 identifies the estimated gaze location 228 of the first user, for example, using the gaze detector 222. As described above, the estimated gaze location 228 generally corresponds to a location on or near the first display device 220 at which a gaze of the first user is directed. The first display device 220 transmits the first video stream 226 and the estimated gaze location 228 to the computing device 210.

The second display device 230 is configured to display video streams received from the computing device 210 and to capture the second video stream 236 using a suitable image sensor (not shown). The image sensor may be similar to the image sensor 132, for example. The second display device 230 does not include a gaze detector or display processor and may be implemented as a smartphone, laptop computer, tablet computing device, mobile computing device, standalone computer monitor and desktop computing device, a television and gaming console, or other suitable components.

The third display device 240 generally corresponds to the display device 120 of FIG. 1 and includes a gaze detector 244 (e.g., gaze detector 142). The third display device 240 captures the third video stream 246 using an image sensor, such as the image sensor 132. Additionally, the third display device 240 identifies an estimated gaze location 248 of the third user, for example, using the gaze detector 244. As described above, the estimated gaze location 248 generally corresponds to a location on or near the display device 240 at which a gaze of the third user is directed. The third display device 240 transmits the third video stream 246 and the estimated gaze location 248 to the computing device 210.

The computing device 210 generates the composite video stream 250 for the video conference using the second video stream 236 and the third video stream 246, in various embodiments. Instead of combining the second video stream 236 and the third video stream 246 into the composite video stream 250 at their respective initial image quality levels, which may correspond to a relatively high transmission bit rate of the video streams, the stream processor 212 is configured to reduce a transmission bit rate of at least one of the second video stream 236 and the third video stream 246 before transmission to the first display device 220. By reducing the transmission bit rate (e.g., from 12 megabits per second to 1 megabit per second), the computing device 210 reduces an amount of bandwidth needed to transmit the composite video stream 250 to the first display device 220. In some scenarios, the lower transmission bit rate also provides for reduced power consumption or faster display frame rates by the first display device 220 when displaying the composite video stream.

In various embodiments, the stream processor 212 reduces the transmission bit rate of video streams by reducing a pixel count, reducing a frame rate, changing a color palette or color space, changing a video coding format, reducing audio quality, or any combination thereof. As one example, the stream processor 212 reduces a pixel count or resolution of a video stream by resampling from 1920×1080 pixels to 1280×720 pixels or by cropping to a smaller size. As another example, the stream processor 212 reduces a frame rate from 60 frames per second to 30 frames per second or 24 frames per second. In another example, the stream processor 212 changes a video coding format to a more efficiently encoded format, such as from an H.262 format to an H.264 or H.265 format. In some embodiments, the stream processor 212 performs the above-described processing by decoding the video stream to obtain decoded data and then encodes the decoded data in a different video coding format or changes parameters of the video coding format to reduce the transmission bit rate. In other embodiments, the stream processor 212 transcodes the video stream into the different video coding format (i.e., using a transcoding algorithm instead of performing separate decoding and encoding steps).

In some scenarios, the computing device 210 also provides composite video streams (not shown) to the remaining participants of the video conference (i.e., to the second display device 230 and third display device 240), but these composite video streams are not shown for clarity. When the computing device 210 provides a composite video stream to a display device other than the first display device 220, the computing device 210 generates a separate composite video stream based on the corresponding estimated gaze location, in a similar manner as described above for the composite video stream 250 (e.g., the third user's estimated gaze location for a composite video stream to be transmitted to the third display device 240). Accordingly, each participant of a video conference may receive video streams of the other participants, but the image quality of the video streams are customized for each participant based on where that participant is gazing. Advantageously, rather than receiving eight medium quality video streams for other participants, the computing device 210 receives one high quality video stream (i.e., displayed within the estimated gaze location) and seven low quality video streams (i.e., displayed outside the estimated gaze location).

FIGS. 3A, 3B, 3C, and 3D depict an example of processing video streams based on estimated gaze locations, according to an embodiment. In the embodiment of FIGS. 3A-3D, the display 130 is shown as viewed by the user 102 of FIG. 1, with a plurality of video streams being displayed from a composite video stream (not shown) received from the computing device 110. The plurality of video streams includes video streams 360, 370, and 380, which are received by the computing device 110 with respective initial image quality levels. Although only three video streams are shown in the embodiment of FIGS. 3A-3D, the plurality of video streams may include four, five, six, or even ten or more video streams, in other embodiments.

The initial image quality levels correspond to a pixel count, frame rate, color palette or color space, and/or video coding format for the plurality of video streams. For example, the video stream 360 may have a pixel count of 1920×1080 and a frame rate of 60 frames per second as its initial image quality level (shown as "1080p60"), the video stream 370 may have a pixel count of 1920×1080 and a frame rate of 30 frames per second as its initial image quality level (shown as "1080p30"), and the video stream 380 may have a pixel count of 1280×720 and a frame rate of 30 frames per second as its initial image quality level (shown as "720p30").

In FIG. 3A, the video streams 360, 370, and 380, are shown without substantive processing by the stream processor 112 that would change their initial image quality level. In FIG. 3B, the user 102 gazes at the video stream 360 and the gaze detector 142 (or gaze detector 114, in other embodiments) provides an estimated gaze location 390A for the user 102 to the stream processor 112. The stream processor 112 then processes at least one of the video streams to have a modified image quality level based on the estimated gaze location 390A. The modified image quality level is less than the corresponding initial image quality level so that a transmission bit rate for the at least one video streams is reduced. In the embodiment shown in FIG. 3B, the modified image quality level corresponds to a 640×360 resolution at 24 frames per second (shown as "360p24").

The stream processor 112 selects video streams to be processed for modified image quality levels based on a distance between the video stream as displayed on the display device 130 and the estimated gaze location. In an embodiment, for example, the estimated gaze location 390A corresponds to a foveal region of the user 102 and the stream processor 112 selects the video streams displayed at locations on the display device 130 outside of the foveal region for the modified image quality levels.

In some embodiments, the stream processor 112 selects the modified image quality level from a plurality of quality levels. In one such embodiment, the stream processor 112 selects lower quality levels for video streams that are located further from the estimated gaze location. In FIG. 3C, the plurality of quality levels may include, from higher quality to lower quality, "1080p60", "1080p30", "1080p24", "720p60", "720p30", "720p24", and "360p24". The stream processor 112 selects a lowest image quality level ("360p24") for the video stream 380 that is furthest from an estimated gaze location 390B, and selects a medium quality level ("720p30") that is still less than the initial image quality level for the video stream 370. The stream processor 112 may select the image quality level based upon a linear formula for the distance from the estimated gaze location, a step-wise formula, exponential formula, or other suitable relationship between the distance and quality level.

In FIG. 3D, an estimated gaze location 390D includes portions of both video streams 370 and 380. In this scenario, the stream processor 112 selects the modified image quality level for the video stream 360 and provides the video streams 370 and 380 at their initial image quality levels.

Although the estimated gaze locations 390A-D are shown as having a same size, the gaze detector 114 or gaze detector 142 may determine estimated gaze locations having different sizes, in various scenarios. For example, the estimated gaze location may be determined to be larger when a confidence level of the determination of the gaze location is lower than a predetermined confidence threshold (i.e., less than 90%). As another example, the estimated gaze location may be determined to be larger when the user 102 is located further away from the display 130.

Figure 4:
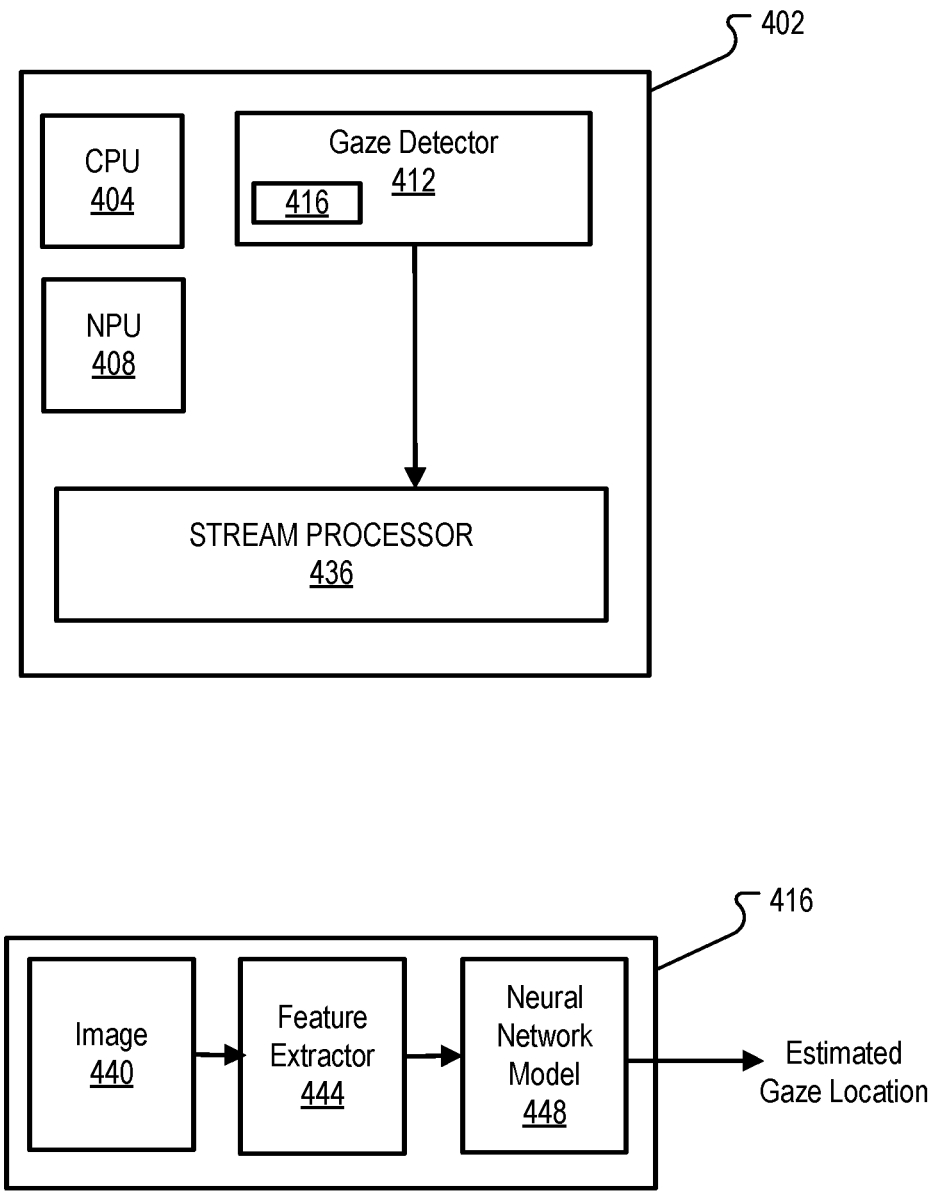
FIG. 4 depicts additional details of a computing device, according to an embodiment.

FIG. 4 depicts additional details of a computing device 402. The computing device 402 may be the same as or similar to the computing device 110 previously described. The computing device 402 may include a central processing unit (CPU) 404, a neural processing unit (NPU) 408, a gaze detector 412, and a stream processor 436. The gaze detector 412 may include a gaze estimator 416.

In examples, the computing device 402 may receive one or more images from an image sensor, for example, image sensor 132. In some examples, the gaze detector 412 may execute processing at the CPU 404 and/or the NPU 408. For example, processing of the gaze estimator 416 may occur at the NPU 408. The NPU 408, being configured to efficiently execute processing associated with neural network models, such as the gaze estimator 416, may allow the gaze detector 412 to operate in or near real-time such that a gaze of a user may be detected in or near real-time without consuming resources traditionally expended by the CPU 404. The gaze detector 412 may receive one or more images 440 from the image sensor 132. The gaze estimator 416 may take the received one or more images 440, and extract one or more features from an image using the feature extractor 444. For example the feature extractor 444 may determine and/or detect a user's face and extract feature information such as, but not limited to, a location of a user's, eyes, pupils, nose, chin, ears etc. In examples, the extracted information may be provided to a neural network model 448 (e.g., neural network model 162), where the neural network model 448 may provide gaze information as an output. In examples, the neural network model 448 may include but is not limited to a transformer model, a convolutional neural network model, and/or a support vector machine model. The gaze information output from the neural network model 448 may be provided to the stream processor 436. For example, the gaze information may include coordinates, (e.g., x, y, z coordinates) of a user's gaze in relation to an origin point on a display associated with a computing device. The stream processor 436 may then process video streams to reduce their transmission bit rate, as described herein.

In examples, the determination of gaze information may occur over one or more images. For example, a user's gaze may be detected and then confirmed when a gaze of the user determined for a satisfactory number of images occurs. For example, to account for natural user eye movement, a gaze of a user may be determined over multiple images, where a confirmation of a user's gaze occurs when the determined gaze for each image of the multiple images, or a subset of images of the multiple images, is directed to approximately the same location. That is, a user's gaze may be based on a gaze in each image, or a subset of images, acquired during the span of 1.8 seconds, for example, which is directed to the same location. Of course other time spans and/or number of images are contemplated.

Figure 5:
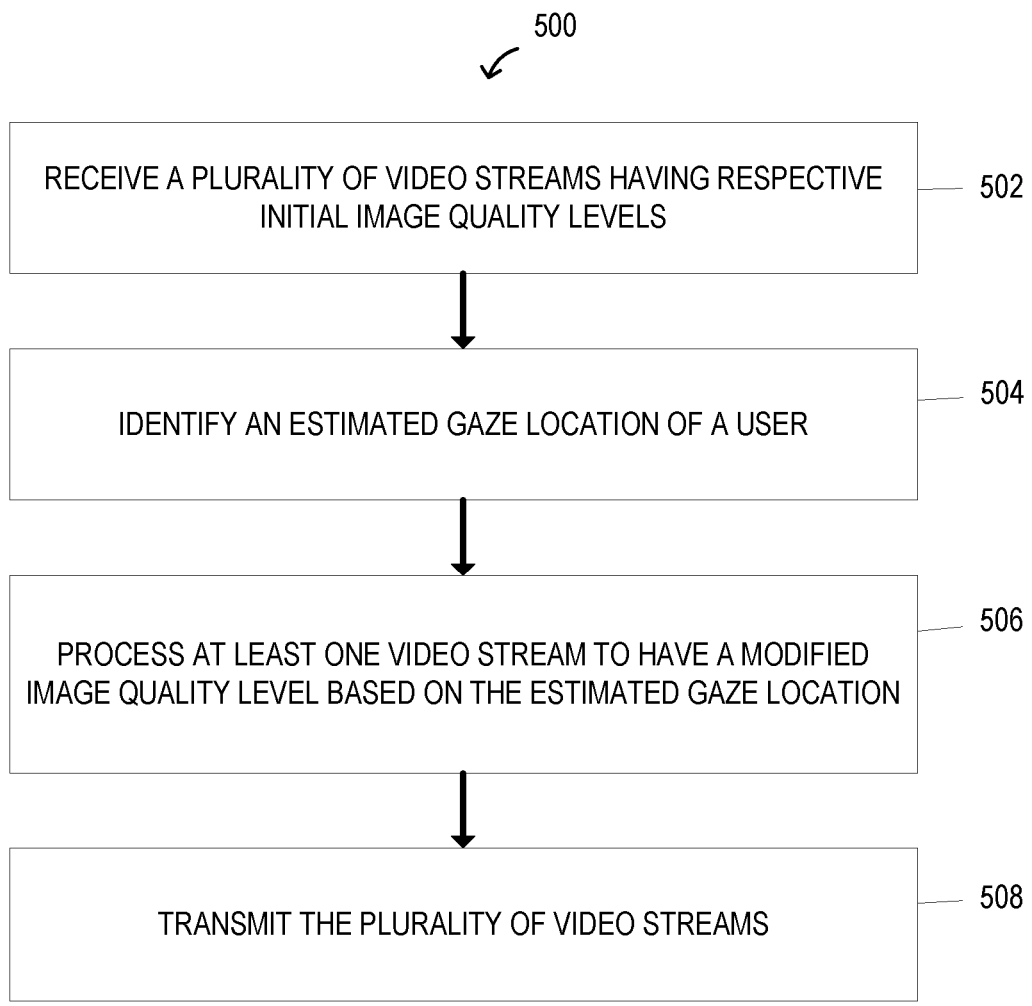
FIG. 5 depicts details of a method for processing video streams, according to an embodiment.

FIG. 5 depicts details of a method 500 for processing video streams, according to an embodiment. A general order for the steps of the method 500 is shown in FIG. 5. Generally, the method 500 starts at step 502 and ends at step 508. The method 500 may include more or fewer steps or may arrange the order of the steps differently than those shown in FIG. 5. The method 500 can be executed as a set of computer-executable instructions executed by a computer system and encoded or stored on a computer readable medium. In examples, aspects of the method 500 are performed by one or more processing devices, such as a computer or server. Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method starts at step 502, where a plurality of video streams are received for transmission to a display device. The plurality of video streams have respective initial image quality levels. The plurality of video streams correspond to the video streams 226, 236, and 246, and the display device corresponds to the first display device 220 in an embodiment. In another embodiment, the plurality of video streams correspond to the video streams 360, 370, and 380 and the display device corresponds to the display device 130.

At step 504, an estimated gaze location of a user of the display device is identified. In an embodiment, the estimated gaze location corresponds to the estimated gaze locations 390. In some embodiments, the estimated gaze location is received from the display device, for example, from the gaze detectors 142 or 222. In other embodiments, one or more images are received from the display device, a plurality of features are extracted from the images, the plurality of features are provided to a neural network (e.g., neural network model 162), and the estimated gaze location is determined as a location on or near the display device at which a gaze of the user is directed using the neural network. In an embodiment, the estimated gaze location corresponds to a foveal region of the user and the at least one video stream corresponds to video streams displayed at locations on the display device outside of the foveal region.

At step 506, at least one video stream of the plurality of video streams is processed to have a modified image quality level based on the estimated gaze location. The modified image quality level is less than a corresponding initial image quality level. The at least one video stream corresponds to the video streams 370 and 380 (FIGS. 3B and 3C) or to video stream 360 (FIG. 3D). The modified image quality level has at least one of a reduced pixel count, reduced frame rate, and an increased compression.

In some embodiments, step 506 includes selecting the modified image quality level from a plurality of quality levels based on a distance between the at least one video stream as displayed on the display device and the estimated gaze location. For example, in FIG. 3C, the stream processor 112 selects the modified image quality level "720p30" for the video stream 370 and selects the modified image quality level "360p24" for the video stream 380 from a plurality of quality levels that include "1080p60", "1080p30", "1080p24", "720p60", "720p30", "720p24", and "360p24". In an embodiment, the modified image quality level is selected based on a distance of the user from the display device and the distance between the at least one video stream as displayed on the display device and the estimated gaze location. For example, reduced quality levels are selected as a user steps back away from the display device.

At step 508, the plurality of video streams are transmitted to the display device. In an embodiment, a composite video stream (e.g., composite video stream 250) that includes the at least one processed video stream having the modified image quality level and remaining video streams of the plurality of video streams is generated and transmitted to the display device.

In some embodiments, the method 500 further includes identifying an updated estimated gaze location and processing the at least one video stream to have the modified image quality level based on the updated estimated gaze location. In an embodiment, for example, the stream processor 112 identifies an updated estimated gaze location as location 390C, from location 390A. The stream processor 112 processes the video stream 360 to have a modified image quality ("360p24") and processes the video streams 370 and 380 to have their respective initial image qualities ("1080p30" and "720p30", respectively).

In some embodiments, the method 500 further includes processing video streams of the plurality of video streams that are displayed at locations within the foveal region to have a reduced image quality level that is higher than the modified image quality level. In other words, the stream processor 112 processes each of the plurality of video streams to have reduced image quality, but those video streams within the foveal region are reduced by a lesser amount than the video streams outside of the foveal region.

Figure 6:
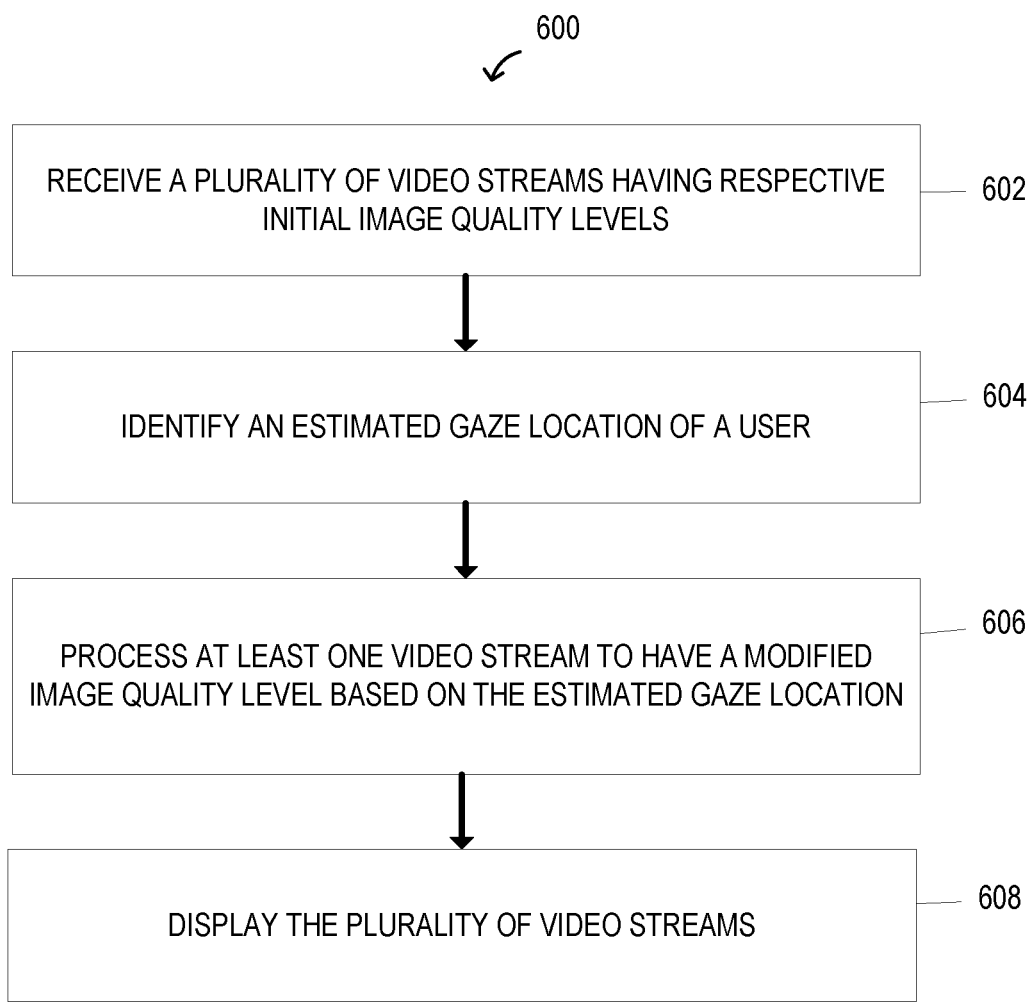
FIG. 6 depicts details of another method for processing video streams, according to an embodiment.

FIG. 6 depicts details of a method 600 for processing video streams, according to an embodiment. A general order for the steps of the method 600 is shown in FIG. 6. Generally, the method 600 starts at step 602 and ends at step 608. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-4.

The method starts at step 602, where a plurality of video streams are received for display by a display device. The plurality of video streams have respective initial image quality levels and may be similar to the video streams 360, 370, and 380 as shown in FIGS. 3A-3D, but the initial image quality levels are relatively low, for example, to reduce the transmission bit rate of the video streams. In an embodiment, the received video streams have an initial image quality level of "360p24", for example.

At step 604, an estimated gaze location of a user of the display device is identified. In an embodiment, the estimated gaze location corresponds to the estimated gaze locations 390. In some embodiments, the estimated gaze location is determined by a gaze detector of the display device, for example, by the gaze detector 142 or 222, and provided to the display processor 144.

At step 606, at least one video stream of the plurality of video streams is processed to have a modified image quality level based on the estimated gaze location. The modified image quality level is higher than a corresponding initial image quality level. The modified image quality level has at least one of an increased pixel count, an increased frame rate, and a reduced compression. In an embodiment, the display processor 144 performs one or more image enhancement algorithms on the at least one video stream to improve its appearance, for example, a super resolution algorithm that increases a spatial resolution or frame rate of the video stream, a sparse reconstruction algorithm, a foveated decoding algorithm, or other suitable image enhancement algorithms. In an embodiment, the display processor 144 selects video streams within the estimated gaze location (or within a threshold distance of the estimated gaze location) and performs the image enhancement algorithms on only those selected video streams. In this way, the display processor 144 generates a display similar to those shown in FIGS. 3B, 3C, and 3D.

At step 608, the plurality of video streams are displayed by the display device.

Figure 7:
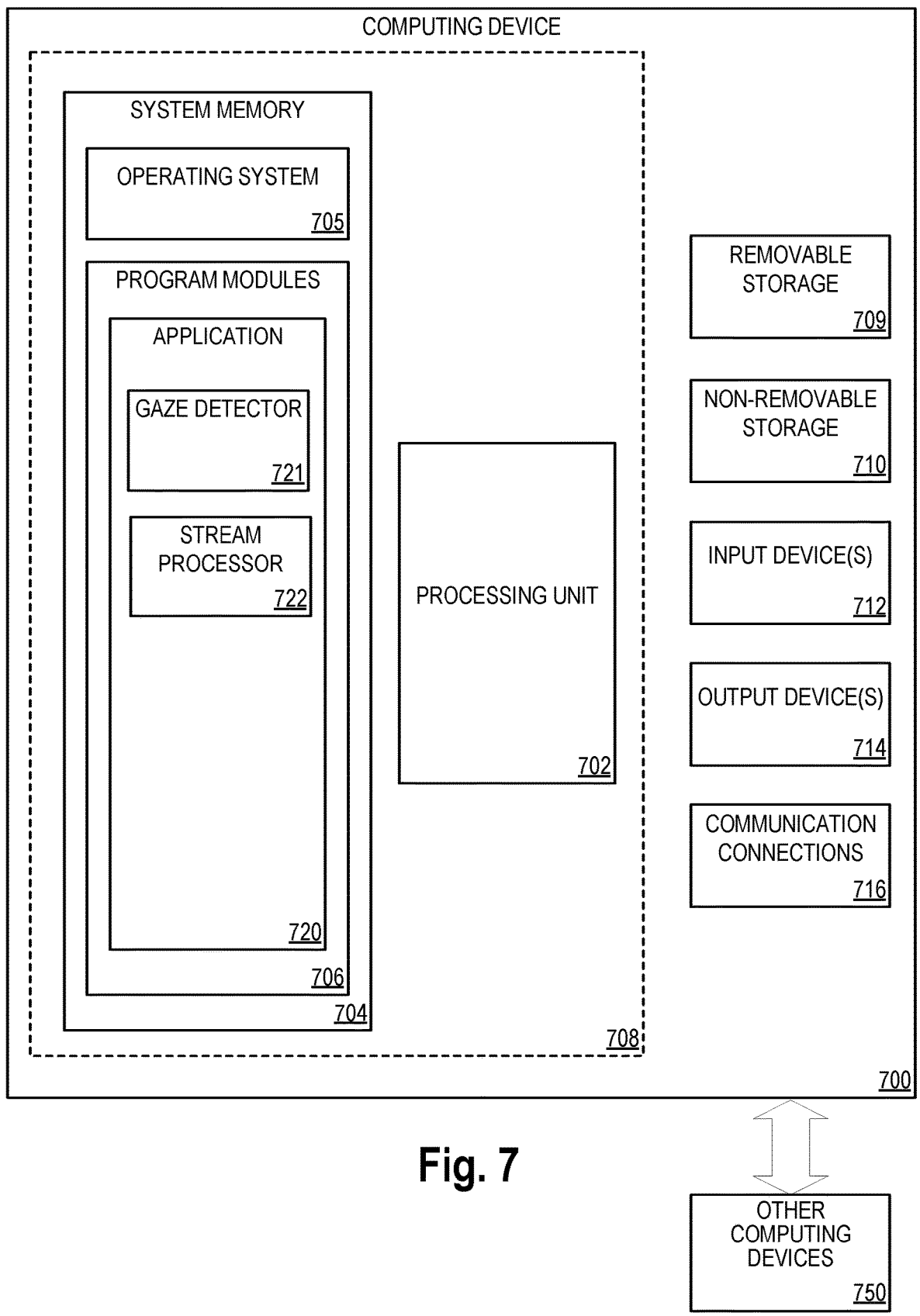
FIG. 7 is a block diagram illustrating physical components (e.g., hardware) of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a video stream processing application 720 on a computing device (e.g., computing device 110, computing device 140, display devices 120, 220, 230, 240), including computer executable instructions for video stream processing application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running video stream processing application 720, such as one or more components with regard to FIGS. 1-2 and, in particular, gaze detector 721 (e.g., including gaze detectors 114, 142, 214, 222, 244) and/or stream processor 722 (e.g., corresponding to stream processor 112, 212).

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., video stream processing application 720) may perform processes including, but not limited to, the aspects, as described herein. Other program modules that may be used in accordance with aspects of the present disclosure, and in particular for processing video streams, may include gaze detector 721 and/or stream processor 722, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
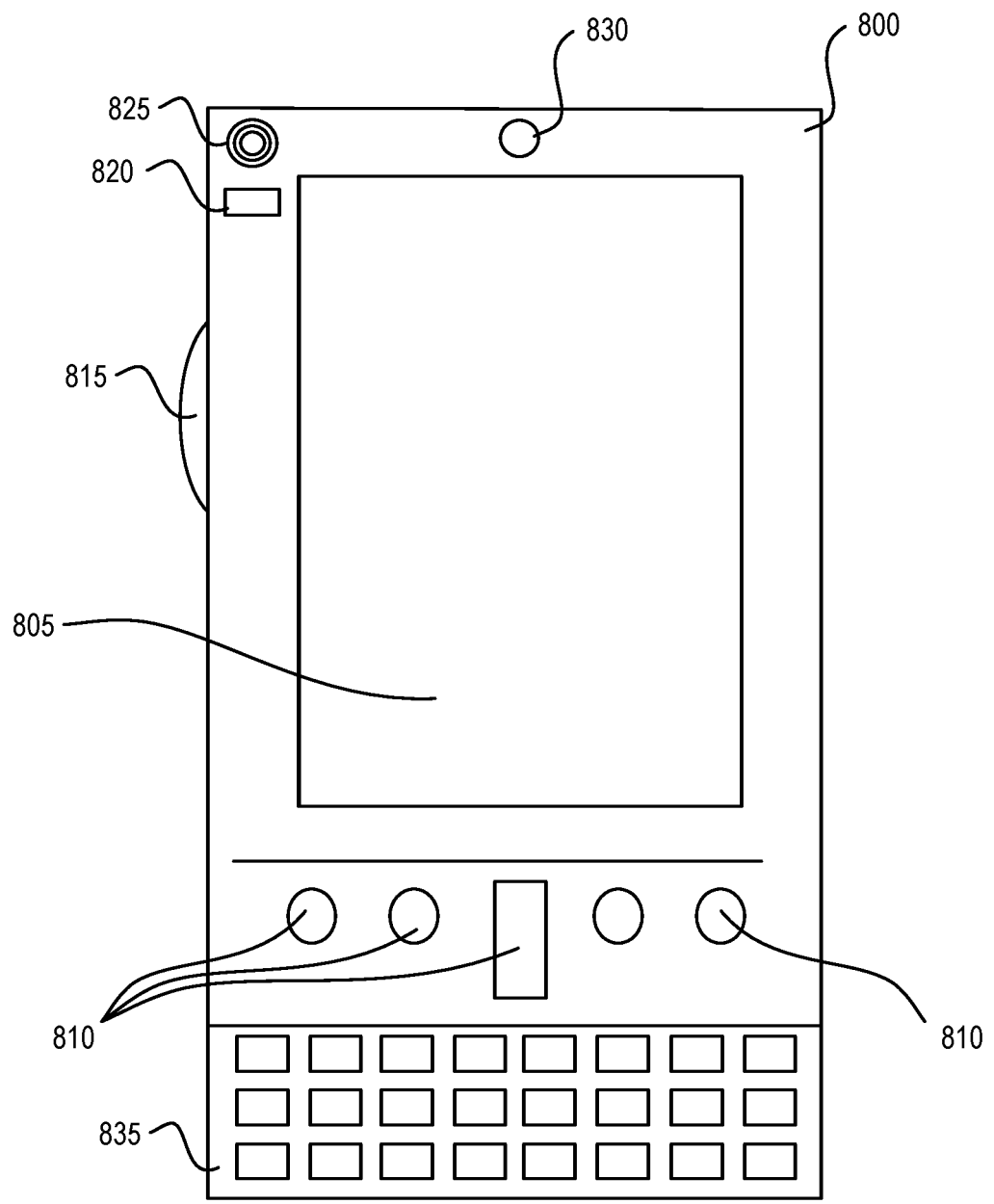
FIGS. 8A and 8B illustrate a mobile computing device, according to an embodiment.
Figure 8B:
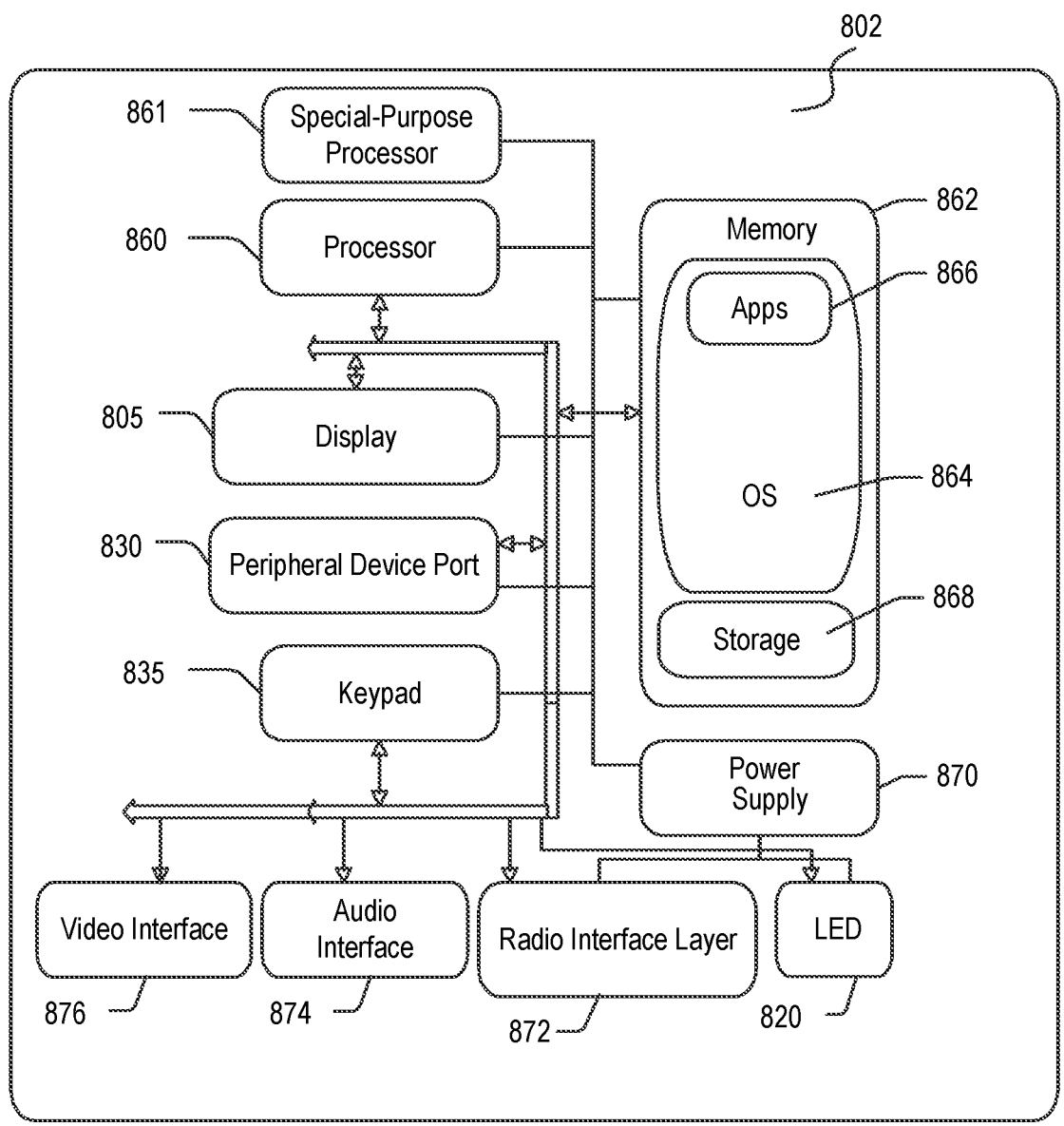

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a High-Definition Multimedia Interface port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for allocating traffic to communication links (e.g., offline routing engine, online routing engine, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for processing video streams, the method comprising:
   receiving a plurality of video streams for transmission to a plurality of display devices, the plurality of video streams having respective initial image quality levels;
   identifying respective estimated gaze locations of users of the plurality of display devices;
   processing some video streams of the plurality of video streams to have a modified image quality level based on the respective estimated gaze locations, the modified image quality level being less than a corresponding initial image quality level;
   generating a plurality of composite video streams, wherein each composite video stream of the plurality of composite video streams comprises processed video streams having the modified image quality level and remaining video streams of the plurality of video streams, the processed video streams being outside of a corresponding respective estimated gaze location and the remaining video streams being within the corresponding estimated gaze location;
   transmitting the plurality of composite video streams to the plurality of display devices.

2. The method of claim 1, wherein the modified image quality level has at least one of a reduced pixel count, a reduced frame rate, and an increased compression relative to the corresponding initial image quality level.

3. The method of claim 1, further comprising identifying an updated estimated gaze location of the respective estimated gaze locations, and processing some of the plurality of video streams to have the modified image quality level based on the updated estimated gaze location.

4. The method of claim 1, wherein processing the some of the video streams comprises selecting the modified image quality level from a plurality of quality levels based on a distance between the some of the video streams as displayed on the display devices and the respective estimated gaze locations.

5. The method of claim 4, wherein selecting the modified image quality level comprises selecting the modified image quality level based on distances of the users from the display devices and the distances between the some of the video streams as displayed on the display devices and the respective estimated gaze locations.

6. The method of claim 1, wherein identifying the respective estimated gaze locations comprises receiving the estimated gaze locations from the display devices.

7. The method of claim 1, wherein identifying the respective estimated gaze locations comprises, for each estimated gaze location in the respective estimated gaze locations:
   receiving one or more images from a one of the display devices;
   extracting a plurality of features from the one or more images;
   providing the plurality of features to a neural network; and
   determining, utilizing the neural network, the estimated gaze location as a location on or near the one of the display devices at which a gaze of a one of the users is directed.

8. The method of claim 1, wherein generating the composite video stream comprises:
   generating the composite video stream to include the remaining video streams having the corresponding initial image quality levels.

9. The method of claim 1, wherein each of the respective estimated gaze locations corresponds to a foveal region of a one of the users and the some of the video streams corresponds to video streams displayed at locations on a one of the display devices outside of the foveal region.

10. The method of claim 9, further comprising processing video streams of the plurality of video streams that are displayed at locations within the foveal region to have a reduced image quality level that is higher than the modified image quality level.

11. A system for processing video streams, the system comprising:
- a processor, and
- a memory storing computer-executable instructions that when executed by the processor cause the system to:
- receive a plurality of video streams for transmission to a plurality of display devices, the plurality of video streams having respective initial image quality levels;
- identify respective estimated gaze locations of users of the plurality of display devices;
- process some video streams of the plurality of video streams to have a modified image quality level based on the respective estimated gaze locations, the modified image quality level being less than a corresponding initial image quality level;
- generate a plurality of composite video streams, wherein each composite video stream of the plurality of composite video streams comprises processed video streams having the modified image quality level and remaining video streams of the plurality of video streams, the processed video streams being outside of a corresponding respective estimated gaze location and the remaining video streams being within the corresponding estimated gaze location;
- transmit the plurality of composite video streams to the plurality of display devices.

12. The system of claim 11, wherein the modified image quality level has at least one of a reduced pixel count, a reduced frame rate, and an increased compression relative to the corresponding initial image quality level.

13. The system of claim 11, wherein processing the some of the video streams further comprises selecting the modified image quality level from a plurality of quality levels based on a distance between the some of the video streams as displayed on the display devices and the estimated gaze locations.

14. The system of claim 13, wherein selecting the modified image quality level comprises selecting the modified image quality level based on a distances of the users from the display devices and the distances between the some of the video streams as displayed on the display devices and the respective estimated gaze locations.

15. The system of claim 11, wherein identifying the respective estimated gaze locations comprises receiving the estimated gaze locations from the display devices.

16. The system of claim 11, wherein generating the composite video stream comprises generating the composite video stream to include the remaining video streams having the corresponding initial image quality levels.

17. The system of claim 11, wherein each of the respective estimated gaze locations corresponds to a foveal region of a one of the users and the some of the video streams corresponds to video streams displayed at locations on a one of the display devices outside of the foveal region.

18. The system of claim 17, further comprising processing video streams of the plurality of video streams that are displayed at locations within the foveal region to have a reduced image quality level that is higher than the modified image quality level.

19. A method for processing video streams, the method comprising:
- receiving a plurality of video streams for display by a display device, the plurality of video streams having respective initial image quality levels;
- identifying an estimated gaze location of a user of the display device;
- processing some video streams of the plurality of video streams to have a modified image quality level based on the estimated gaze location, the modified image quality level being higher than a corresponding initial image quality level;
- displaying the processed video streams and remaining video streams of the plurality of video streams by the display device, the remaining video streams having the respective initial image quality levels.

20. The method of claim 19, wherein the modified image quality level has at least one of an increased pixel count, an increased frame rate, and a reduced compression relative to the corresponding initial image quality level.

* * * * *